US012780303B2

(12) United States Patent
Nakajima et al.

(10) Patent No.: US 12,780,303 B2
(45) Date of Patent: Nov. 3, 2026

(54) VEHICLE STEERING SYSTEM PROVIDING STEERING ASSIST BASED ON LATERAL ACCELERATION

(71) Applicant: Mitsubishi Electric Corporation, Tokyo (JP)

(72) Inventors: Shunsuke Nakajima, Tokyo (JP); Akio Numakura, Tokyo (JP); Hideki Doi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 495 days.

(21) Appl. No.: 18/283,976

(22) PCT Filed: May 21, 2021

(86) PCT No.: PCT/JP2021/019360
§ 371 (c)(1),
(2) Date: Sep. 25, 2023

(87) PCT Pub. No.: WO2022/244233
PCT Pub. Date: Nov. 24, 2022

(65) Prior Publication Data
US 2024/0166258 A1 May 23, 2024

(51) Int. Cl.
*B62D 15/02* (2006.01)
*B62D 5/04* (2006.01)
*B62D 6/00* (2006.01)

(52) U.S. Cl.
CPC ........... *B62D 6/008* (2013.01); *B62D 5/0457* (2013.01)

(58) Field of Classification Search
CPC .... B62D 15/025; B62D 6/008; B62D 5/0457; B60W 30/12; B60W 30/09; B60W 10/20
See application file for complete search history.

(56) References Cited

U.S. PATENT DOCUMENTS 10,150,470 B2 * 12/2018 Wang .................. B62D 5/0481
10,656,651 B2 * 5/2020 Ozawa ............... B60W 10/184
(Continued)

FOREIGN PATENT DOCUMENTS

CN 105882738 A 8/2016
JP 2005-067484 A 3/2005
(Continued)

OTHER PUBLICATIONS

Communication dated Nov. 5, 2024 from the Japanese Patent Office in Application No. 2023-522158.
(Continued)

*Primary Examiner* — Gonzalo Laguarda
(74) *Attorney, Agent, or Firm* — Sughrue Mion, PLLC

(57) ABSTRACT

A motor vehicle steering system comprises: a steering control-quantity calculation unit for calculating a steering control quantity to move a motor vehicle closer to its target running road-route line; a lateral acceleration detection unit for detecting a lateral acceleration of the motor vehicle; a steering control-quantity limit-value calculation unit for calculating a steering control-quantity limit-value on the basis of a lateral acceleration detected by the lateral acceleration detection unit in such a manner that a lateral acceleration of the motor vehicle is limited to a lateral acceleration limit-value; a limitation determination unit for determining effectiveness of steering control-quantity's limitation or ineffectiveness thereof on the basis of the lateral acceleration; and a steering control-quantity limiting unit for limiting a steering control quantity on the basis of the steering control-quantity limit-value, when the limitation determination unit determines that steering control-quantity's limitation is effective.

15 Claims, 6 Drawing Sheets

(56) References Cited

U.S. PATENT DOCUMENTS

| | | | | |
|---|---|---|---|---|
| 11,014,553 | B2 * | 5/2021 | Ozawa | B60W 10/184 |
| 2015/0012179 | A1 | 1/2015 | Matsuno | |
| 2016/0244092 | A1 * | 8/2016 | Matsuo | B62D 6/002 |
| 2018/0134290 | A1 * | 5/2018 | Kataoka | B62D 15/025 |
| 2018/0201318 | A1 | 7/2018 | Kataoka et al. | |
| 2020/0189591 | A1 | 6/2020 | Mellinger III et al. | |

FOREIGN PATENT DOCUMENTS

| | | | |
|---|---|---|---|
| JP | 2015-013545 | A | 1/2015 |
| JP | 2016-147590 | A | 8/2016 |
| JP | 2018-114806 | A | 7/2018 |

OTHER PUBLICATIONS

Extended European Search Report issued Jul. 3, 2024 in European Application No. 21940847.3.

International Search Report for PCT/JP2021/019360 dated Aug. 10, 2021 [PCT/ISA/210].

Communication dated Jan. 31, 2026, issued in Chinese Application No. 202180098243.1.

* cited by examiner

VEHICLE STEERING SYSTEM PROVIDING STEERING ASSIST BASED ON LATERAL ACCELERATION

CROSS REFERENCE TO RELATED APPLICATIONS

This application is a National Stage of International Application No. PCT/JP2021/019360 filed May 21, 2021.

TECHNICAL FIELD

The disclosure of the present application relates to an automotive or motor vehicle steering system, and in particular to a motor vehicle steering system which assists the steering operations so that a motor vehicle runs by following up along a target running road-route line.

BACKGROUND ART

Conventionally, a technology is known in which steering assist and/or automatic steering are performed on a steering-wheel turn tire-wheel(s) so that a motor vehicle runs to follow up along a desired target running road-route line.

For example, firstly, there exists a technology as in Patent Document 1 in which, by using a camera mounted on a motor vehicle toward the front thereof, white coat-lines on a road are recognized, whereby steering controls are performed so that the motor vehicle runs in the center of a vehicle lane (hereinafter, a lane keeping system). Secondly, there exists a technology as in Patent Document 2 in which a host-vehicle location, a target point of location where an operator or driver sets in advance, geographic road-map data and the like are grasped by means of satellite-based information, whereby a target locus is calculated, and steering controls are performed so as to follow up along the target locus.

RELATED ART DOCUMENTS

Patent Documents

Patent Document 1 Japanese Laid-Open Patent Publication No. 2015-13545

Patent Document 2: Japanese Laid-Open Patent Publication No. 2005-67484

SUMMARY OF THE INVENTION

Problems to be Solved by the Invention

In a conventional motor vehicle steering system described in Patent Documents 1 and 2, steering assist is performed so as to follow up along a target running road-route line on the basis of a camera and/or on that of satellite-based information; and thus, depending on a target running road-route line, the motor vehicle steering system causes sharp steering which results in increasing a lateral acceleration of an automotive or motor vehicle, so that there arises a problem in imposing feelings of anxiety to an operator or driver and/or unpleasant feelings thereto. In particular, for example, a camera and/or satellite-based information are erroneously recognized, whereby a motor vehicle steering system and/or a driver steer a motor vehicle in a direction which is not intended for, so that, in such a case, it is significant in imposing feelings of anxiety to the driver and unpleasant feelings thereto.

The present disclosure in the application concerned has been directed at resolving those problems as described above, an object of the disclosure is to provide an automotive or motor vehicle steering system which acts to mitigate burdens of an operator or driver originating in the feelings of anxiety of the driver and in unpleasant feelings thereof.

Means for Solving the Problems

In a motor vehicle steering system disclosed in the disclosure of the application concerned, the motor vehicle steering system comprises: a steering control-quantity calculation unit for calculating a steering control quantity to move a motor vehicle closer to a target running road-route line thereof; a lateral acceleration detection unit for detecting a lateral acceleration of the motor vehicle; a steering control-quantity limit-value calculation unit for calculating a steering control-quantity limit-value on the basis of a lateral acceleration detected by the lateral acceleration detection unit in such a manner that a lateral acceleration of the motor vehicle is limited to a lateral acceleration limit-value; a limitation determination unit for determining effectiveness of steering control-quantity's limitation or ineffectiveness thereof at least on the basis of the lateral acceleration; and a steering control-quantity limiting unit for limiting a steering control quantity on the basis of the steering control-quantity limit-value, when the limitation determination unit determines that steering control-quantity's limitation is effective.

Effects of the Invention

According to the motor vehicle steering system disclosed in the disclosure of the application concerned, a steering control-quantity limit-value is calculated so that a lateral acceleration of a motor vehicle is limited to a lateral acceleration limit-value, and a steering control quantity is limited on the basis of the steering control-quantity limit-value; and thus, without depending on running environments such as the variability of motor vehicles and/or a cant or the like of a running road-route, it becomes possible to uniformly limit a lateral acceleration of a motor vehicle produced by means of the system, so that it becomes possible to mitigate burdens of an operator or driver originating in the feelings of anxiety of the driver and in unpleasant feelings thereof.

EMBODIMENTS FOR CARRYING OUT THE INVENTION

Embodiment 1

Figure 1:
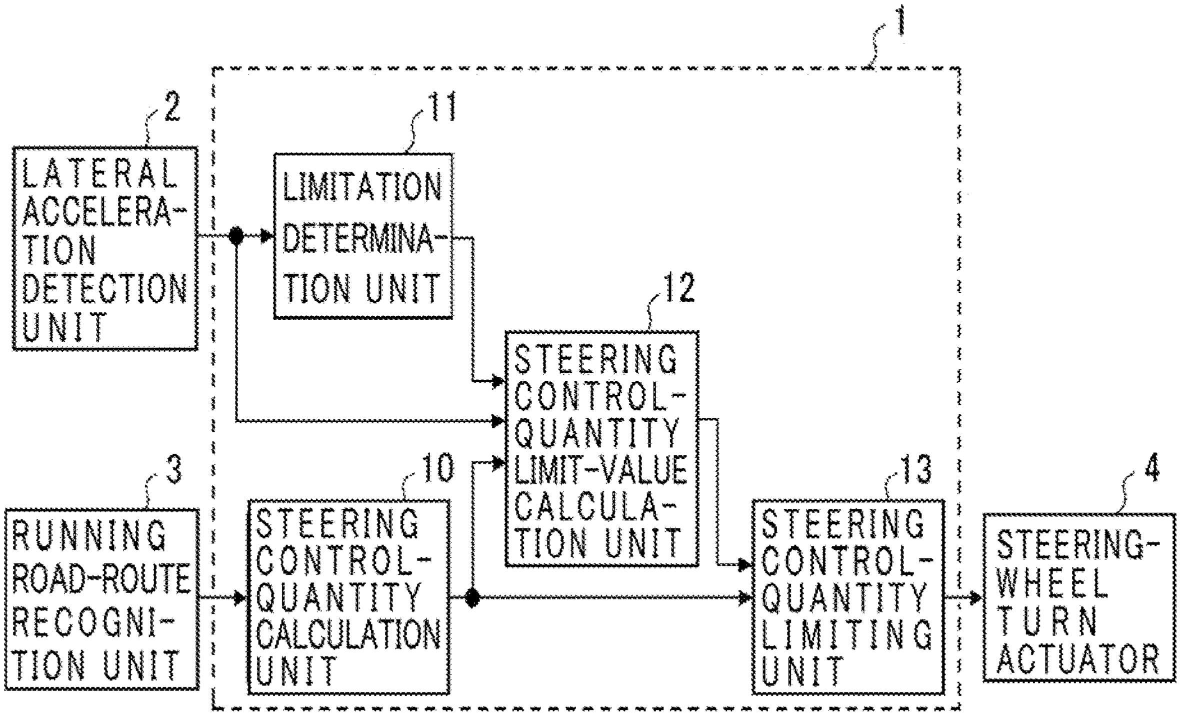
FIG. 1 is a functional block diagram illustrating a motor vehicle steering system according to Embodiment 1.

Hereinafter, the explanation will be made referring to the drawings for motor vehicle steering systems disclosed in the disclosure of the application concerned according to the embodiments.

FIG. 1 is a functional block diagram illustrating a configuration of a motor vehicle steering system according to Embodiment 1. As illustrated in FIG. 1, the motor vehicle steering system comprises an automotive or motor vehicle steering apparatus 1 (hereinafter, there arises a case in which the "steering apparatus 1" is referred to), and a lateral acceleration detection unit 2, a running road-route recognition unit 3 and a steering-wheel turn actuator 4. Note that, in the following explanation, an automotive or motor vehicle on which the steering apparatus 1 is mounted is referred to as a "host vehicle."

The steering apparatus 1 comprises a steering control-quantity calculation unit 10, a limitation determination unit 11, a steering control-quantity limit-value calculation unit 12 and a steering control-quantity limiting unit 13; and a lateral acceleration detected by the lateral acceleration detection unit 2 is inputted into the limitation determination unit 11 and the steering control-quantity limit-value calculation unit 12 each, and running road-route information detected by the running road-route recognition unit 3 is inputted into the steering control-quantity calculation unit 10, so that the steering apparatus outputs a steering control quantity. Here, in the steering apparatus 1, it may also be suitable for providing the control functions of a general electric power steering apparatus.

The lateral acceleration detection unit 2 is a sideward or lateral G-sensor for example; and the lateral acceleration detection unit detects a lateral acceleration of a host vehicle, and outputs it into the steering apparatus 1. Note that, it may also be so arranged that the lateral acceleration detection unit 2 detects a yaw rate of the host vehicle and a vehicle velocity thereof, and outputs a value of the yaw rate and that of the vehicle velocity as the lateral acceleration; and so, the detection method will not be questioned for.

The running road-route recognition unit 3 is a camera(s) for shooting a frontward image(s) of a motor vehicle, for example; and, on the basis of the pickup or photographed image (s), the running road-route recognition unit recognizes, along a running road-route toward the front, vehicle lane's boundary lines such as a roadway's outer lateral line(s), a roadway's boundary line (s), a roadway's center line and the like, for example. And then, the running road-route recognition unit recognizes, from a location of vehicle lane's boundary lines in a host-vehicle coordinate system, a running vehicle lane on which the host vehicle runs, which is outputted into the steering apparatus 1 as running road-route information. The host-vehicle coordinate system designates a coordinate system in which a base point denoted on the host vehicle is defined as the center.

The steering-wheel turn actuator 4 produces steering-wheel turn driving-force (driving torque) being target torque corresponding to a steering control quantity inputted from the steering apparatus 1, so that a steering-wheel turn tire-wheel(s) of the host vehicle undergoes turn directions. As for the steering-wheel turn actuator 4, an electric motor of electric power steering or an oil-hydraulic motor can be used, for example. And thus, kinds of motors are not particularly limited to, so that a DC motor and an AC motor can be used.

Next, the explanation will be made for an internal configuration of the steering apparatus 1.

The steering control-quantity calculation unit 10 sets, within a running road-route on the basis of running road-route information in a host-vehicle coordinate system, a target running road-route line which becomes a target to make a motor vehicle run by following up the running road-route, and outputs a steering control quantity to make the host vehicle run by following up along the target running road-route line.

Here, a target running road-route line is set, for example, at a location in a host-vehicle coordinate system being distant from a vehicle lane's boundary line on the right-hand side by a predetermined distance (for example, ½ of the width of a running road-route); namely, the target running road-route line is set in the center of a running vehicle lane. Note that, the predetermined distance may appropriately be changed in accordance with preferences of an operator or driver, and in accordance with a neighboring environment and the like. In addition, a calculation method of a steering control quantity in the steering control-quantity calculation unit 10 is well-known in a technology for performing steering assist on a steering-wheel turn tire-wheel(s) or for performing automatic steering thereon so that the running is achieved to follow up along a desired target running road-route line. For example, it is suitable that target torque for driving a steering-wheel turn actuator disclosed in Japanese Patent Publication No. 6012824 is defined as the aforementioned steering control quantity; and so, the means will not be questioned for.

The limitation determination unit 11 performs determination on the presence or absence of the limitation of steering control quantity by means of the comparison between a lateral acceleration of a host vehicle and an arbitrary lateral acceleration limit-value being set in advance, and performs the output into the steering control-quantity limit-value calculation unit 12 as a limitation determination flag. As for a limitation determination flag, the limitation determination flag is set at "limitation in presence" when at least a lateral acceleration of a host vehicle is at a lateral acceleration limit-value or more, and the limitation determination flag is set at "limitation in absence" when at least a lateral acceleration of the host vehicle is smaller than the lateral acceleration limit-value.

Here, it is so arranged that a lateral acceleration limit-value for use in determining the presence or absence of the limitation is similar to a lateral acceleration limit-value for use in calculating a steering control-quantity limit-value in the steering control-quantity limit-value calculation unit 12 as will be described later; however, it may also be so arranged that individually different values are set. In addition, it may also be so arranged that a lateral acceleration limit-value for determining "limitation in presence" and that for determining "limitation in absence" are set at individually different values, and they are provided with hysteresis each other.

Moreover, instead of performing determination only on the basis of a lateral acceleration of a host vehicle, it may also be so arranged that the determination is performed in accordance with a varying magnitude relationship between a steering control-quantity limit-value in the steering control-quantity limit-value calculation unit 12 and a steering control quantity. In this case, for example, it is suitable that the limitation determination unit performs determination on a limitation determination flag as described below:

(a) in a case in which a lateral acceleration of a host vehicle is at a lateral acceleration limit-value or more, and also a case in which a steering control-quantity limit-value is larger than a steering control quantity, “limitation in presence” is outputted as for the limitation determination flag;

(b) in a case in which a steering control-quantity limit-value is smaller than a steering control quantity, “limitation in absence” is outputted as for the limitation determination flag; and (c) in another case other than the cases described above, a previous output value is held as for the limitation determination flag.

By adopting such determination that is performed as described above, even when a lateral acceleration of a host vehicle becomes a lateral acceleration limit-value or less, a steering control-quantity limit-value is reduced, and “limitation in presence” is continued to be outputted until a value of steering control quantity becomes to be coincident with the steering control-quantity limit-value; and thus, it becomes possible to curb the variation of a steering control quantity corresponding to the difference between a steering control-quantity limit-value at a time of changing over from “limitation in presence” to “limitation in absence” and the steering control quantity, so that it becomes possible to contribute to the mitigating of burdens with respect to an operator or driver which originate in the feelings of anxiety of the driver and in unpleasant feelings thereof.

The steering control-quantity limit-value calculation unit 12 calculates, on the basis of a lateral acceleration being inputted thereinto, on that of a steering control quantity being inputted thereinto, and on that of a limitation determination flag being inputted thereinto, a steering control-quantity limit-value so that a lateral acceleration being produced on a host vehicle becomes an arbitrary lateral acceleration limit-value being set in advance or less; and the steering control-quantity limit-value calculation unit outputs the steering control-quantity limit-value into the steering control-quantity limiting unit 13.

The steering control-quantity limiting unit 13 limits a steering control quantity, on the basis of a steering control quantity being inputted thereinto and on that of a steering control-quantity limit-value being inputted thereinto, so that the steering control quantity becomes the steering control-quantity limit-value or less; and the steering control-quantity limiting unit outputs the steering control quantity into the steering-wheel turn actuator 4.

Figure 2:
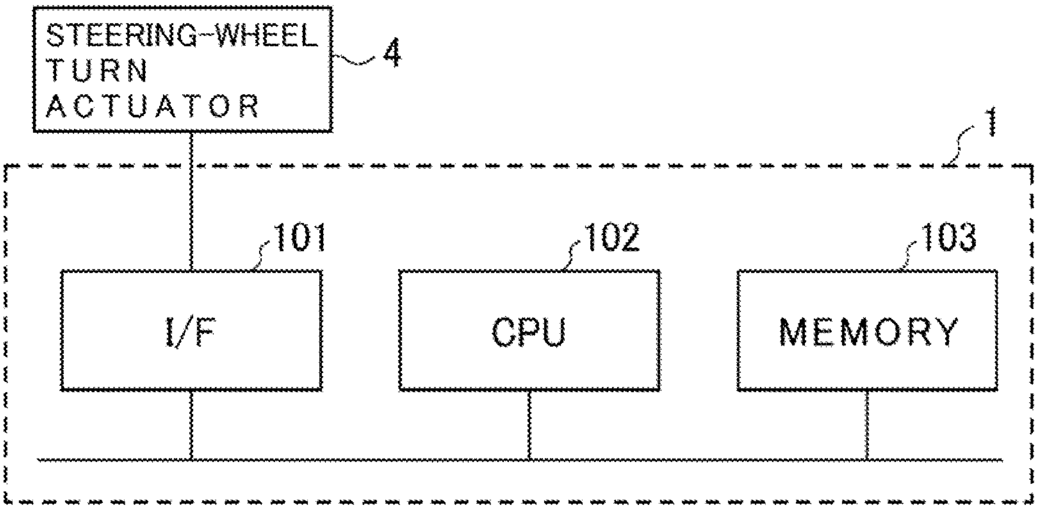
FIG. 2 is a diagram illustrating a hardware configuration of an automotive or motor vehicle steering apparatus in the motor vehicle steering system according to Embodiment 1.

In FIG. 2, illustrated is a hardware configuration in a case in which each of blocks (the steering control-quantity calculation unit 10, the limitation determination unit 11, the steering control-quantity limit-value calculation unit 12 and the steering control-quantity limiting unit 13) of the steering apparatus 1 illustrated in FIG. 1 is made by using a processor such as a CPU (Central Processing Unit), a DSP (Digital Signal Processor) or the like. In this case, the function of each of the blocks of the steering apparatus 1 is achieved by means of a combination with software or the like (software, firmware, or software and firmware). The software or the like is described as a program(s), and is stored in a memory 103 (storage device).

An interface (I/F) 101 performs input-output controls of signals with respect to an external device(s) such as the running road-route recognition unit 3 or the like. Note that, in FIG. 2, only the configuration is shown in which the steering-wheel turn actuator 4 is connected by way of the I/F 101.

A CPU 102 executes various kinds of processing in accordance with a program(s) stored in the memory 103, whereby the function of each of the blocks of the steering apparatus 1 is achieved. The I/F 101, the CPU 102 and the memory 103 of these are connected through buses to one another.

Figure 3:
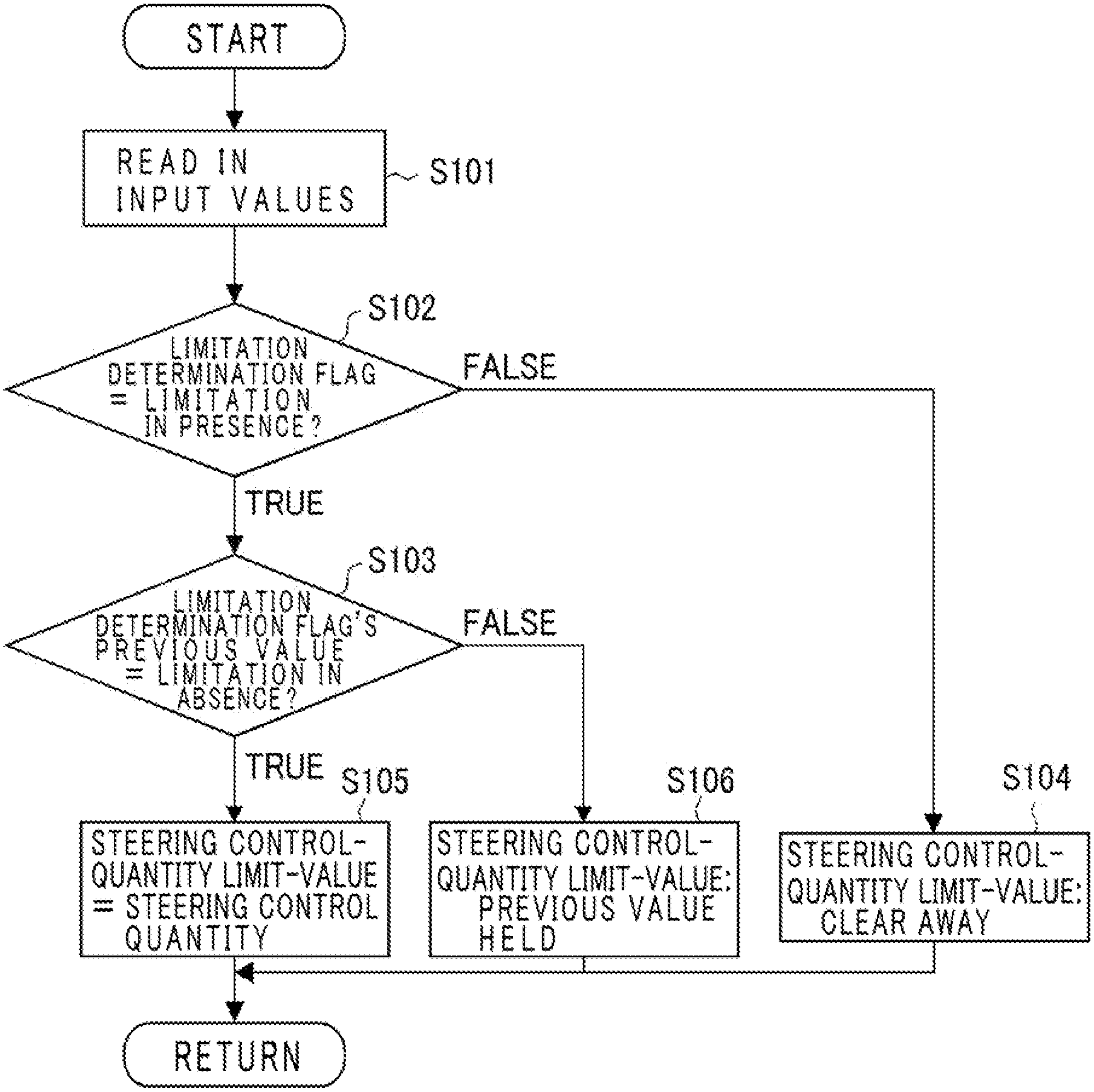
FIG. 3 is a flowchart for explaining the operations by a steering control-quantity limit-value calculation unit in the motor vehicle steering system according to Embodiment 1.

FIG. 3 is a flowchart for explaining the operations of the steering control-quantity limit-value calculation unit 12.

First, at Step S101, the steering control-quantity limit-value calculation unit 12 reads in a lateral acceleration into which the lateral acceleration detection unit 2 outputs, a steering control quantity into which the steering control-quantity calculation unit 10 outputs and a limitation determination flag into which the limitation determination unit 11 outputs.

Next, at Step S102, condition-based or conditional branch determination is performed on the basis of a limitation determination flag; and, in a case in which the limitation determination flag is set at “limitation in presence,” the processing proceeds to Step S103, and, in a case other than the aforementioned case, the processing proceeds to Step S104.

At Step S103, conditional branch determination is further performed on the basis of a control limitation determination flag; and, in a case in which the limitation determination flag reaches from “limitation in absence” to “limitation in presence,” namely, in a case in which a lateral acceleration of a host vehicle reaches from the lateral acceleration thereof that is smaller in value than an arbitrary lateral acceleration limit-value to the lateral acceleration limit-value, the processing proceeds to Step S105, and, in a case other than the aforementioned case, the processing proceeds to Step S106.

From Step S104 to Step S106, a steering control-quantity limit-value is calculated in accordance with a respective limitation determination flag.

At Step S104, a limitation determination flag indicates “limitation in absence,” namely designates a state that it is not necessary to limit a steering control quantity because a lateral acceleration of the host vehicle is smaller than a lateral acceleration limit-value; and thus, a steering control-quantity limit-value is cleared away in the steering control-quantity limiting unit 13 to a value by which a steering control quantity would not be limited therein, for example, to a value larger than a steering control quantity in which a motor vehicle steering system is able to take on. Note that, it is only necessary that a value takes on in the steering control-quantity limiting unit 13 so that the steering control quantity would not be limited therein; and so, the value itself being set will not be questioned for.

At Step S105, in a case in which a limitation determination flag becomes from “limitation in absence” to “limitation in presence,” namely, in a case in which a lateral acceleration of a host vehicle reaches from the lateral acceleration thereof that is smaller in value than an arbitrary lateral acceleration limit-value to the lateral acceleration limit-value, a steering control-quantity limit-value is set at a steering control quantity so that a lateral acceleration of the host vehicle should not increase even more to an extent exceeding. In other words, it can be said that a steering control-quantity limit-value is set to a steering control quantity so that a lateral acceleration of the host vehicle becomes corresponding to the lateral acceleration limit-value.

At Step S106, the limitation determination flag is set in a state of "limitation in presence" so that the state indicates that the limitation of a lateral acceleration of a host vehicle should be continued; and thus, it is so arranged that a steering control-quantity limit-value is set at "Previous Value Held," namely that a value having been set at a time point of Step S105 is held as it is. By means of Step S105 and Step S106, a lateral acceleration of a host vehicle holds a steering control quantity at a time point when a lateral acceleration limit-value is reached, whereby it becomes possible to prevent that a lateral acceleration of the host vehicle increases even more to an extent exceeding.

According to the manner described above, a steering control-quantity limit-value is calculated so that a lateral acceleration of a motor vehicle is limited to a lateral acceleration limit-value, and a steering control quantity is limited on the basis of the steering control-quantity limit-value; and thus, without depending on running environments such as the variability of motor vehicles and/or a cant or the like of a running road-route, it becomes possible to uniformly limit a lateral acceleration of a motor vehicle produced by means of the system. And therefore, without depending on running environments such as the variability of motor vehicles and/or a cant or the like of the running road-route, it becomes possible to mitigate burdens of an operator or driver originating in the feelings of anxiety of the driver and in unpleasant feelings thereof.

Moreover, a steering control quantity of a motor vehicle steering system is limited to; and thus, it is easier to achieve that the steering control quantity takes on a continuous behavior before and after the limitation, and the lateral acceleration does not also become discontinuous, so that it enables to contribute to the mitigating of burdens with respect to an operator or driver which originate in the feelings of anxiety of the driver and in unpleasant feelings thereof.

Embodiment 2

In Embodiment 1, a steering control-quantity limit-value is defined in the steering control-quantity limit-value calculation unit 12 as a steering control-quantity limit-value by which a steering control quantity at a time point when a lateral acceleration of a host vehicle reaches at a lateral acceleration limit-value is held, whereby the lateral acceleration of the host vehicle is limited so as to become an arbitrary lateral acceleration limit-value or less.

For dealing therewith, in Embodiment 2, the explanation will be made for a motor vehicle steering system using an automotive or motor vehicle steering apparatus 1*a* which comprises a steering control-quantity limit-value calculation unit 12*a* for calculating a steering control-quantity limit-value in accordance with the deviation between a lateral acceleration limit-value and a lateral acceleration of a host vehicle.

Figure 4:
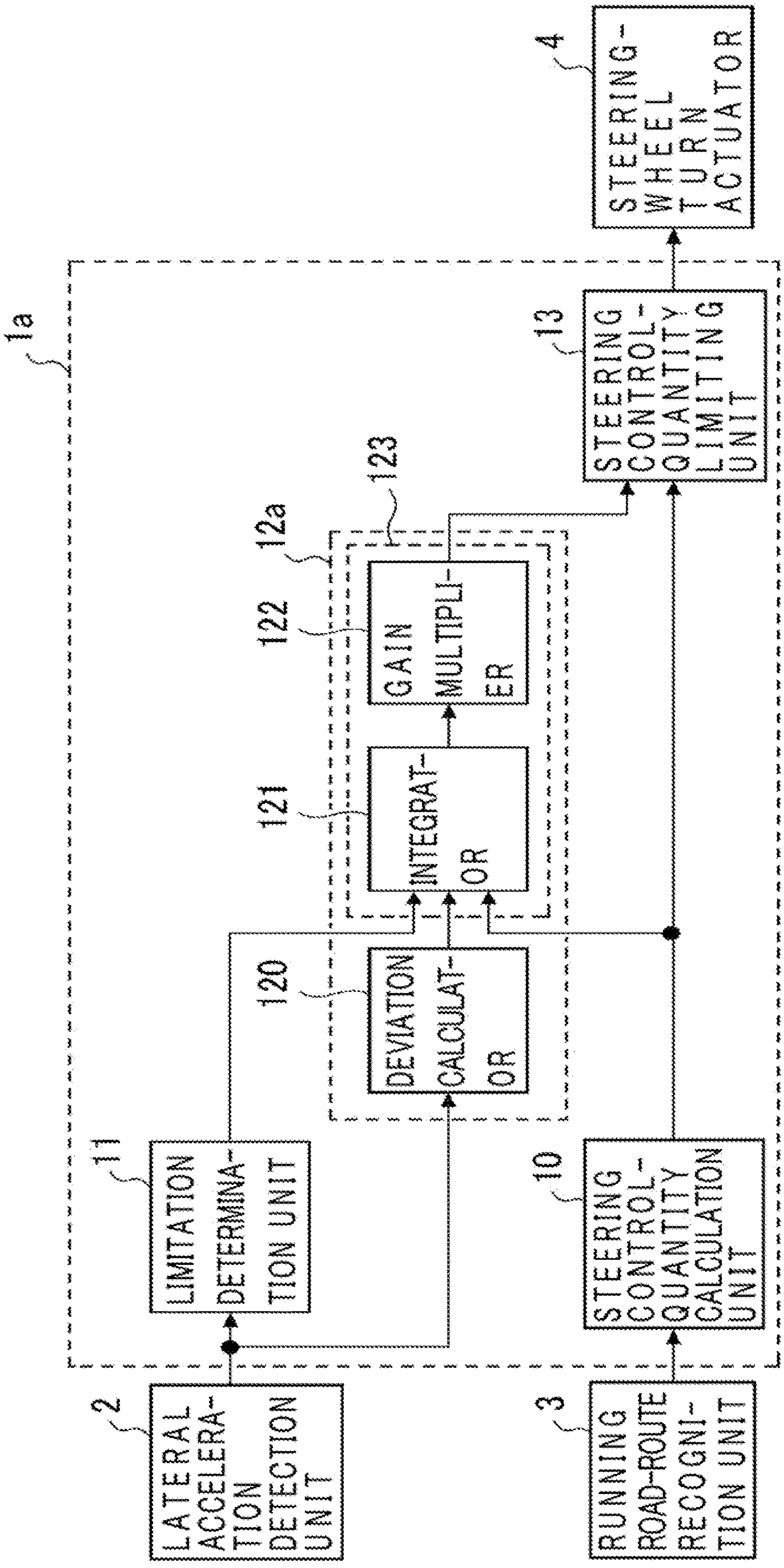
FIG. 4 is a functional block diagram illustrating a motor vehicle steering system according to Embodiment 2.

FIG. 4 is a functional block diagram illustrating the configuration of the motor vehicle steering system in Embodiment 2, where the same reference numerals and symbols denoted in Embodiment 1 designate the same items or corresponding items.

The steering control-quantity limit-value calculation unit 12*a* in the motor vehicle steering apparatus 1*a* comprises a deviation calculator 120, an integrator 121 and a gain multiplier 122, wherein a lateral acceleration detected by the lateral acceleration detection unit 2 is inputted into the deviation calculator 120, and a limitation determination flag calculated by the limitation determination unit 11 and a steering control quantity calculated by the steering control-quantity calculation unit 10 are each inputted into the integrator 121, so that a steering control-quantity limit-value is calculated in such a manner that a lateral acceleration produced on a host vehicle becomes at a lateral acceleration limit-value being arbitrarily set or less, and the steering control-quantity limit-value is outputted into the steering control-quantity limiting unit 13.

Next, the explanation will be made for an internal configuration of the steering control-quantity limit-value calculation unit 12*a*.

The deviation calculator 120 calculates, on the basis of a lateral acceleration, the deviation between an arbitrary lateral acceleration limit-value and the absolute value of lateral acceleration, and outputs the deviation into the integrator 121 as a lateral acceleration deviation.

The integrator 121 calculates, on the basis of a limitation determination flag, on that of a steering control quantity and on that of a lateral acceleration deviation, a lateral acceleration integration value in accordance with the limitation determination flag, and outputs the lateral acceleration integration value.

The gain multiplier 122 multiplies a lateral acceleration integration value by an arbitrary gain being set in advance, which is then outputted therefrom as a steering control-quantity limit-value. Here, it may be so arranged that a gain to be multiplied is defined as a value capable of being altered in accordance with a vehicle velocity of a host vehicle; and, in this case, it may also be so arranged that, for example, the gain is acquired by referring to a map corresponding to a vehicle velocity of the host vehicle being detected. It should be noted that, the function is provided as a deviation amplification-unit or amplifier 123 by which an output of the deviation calculator 120 is amplified by means of the integrator 121 and the gain multiplier 122.

Figure 5:
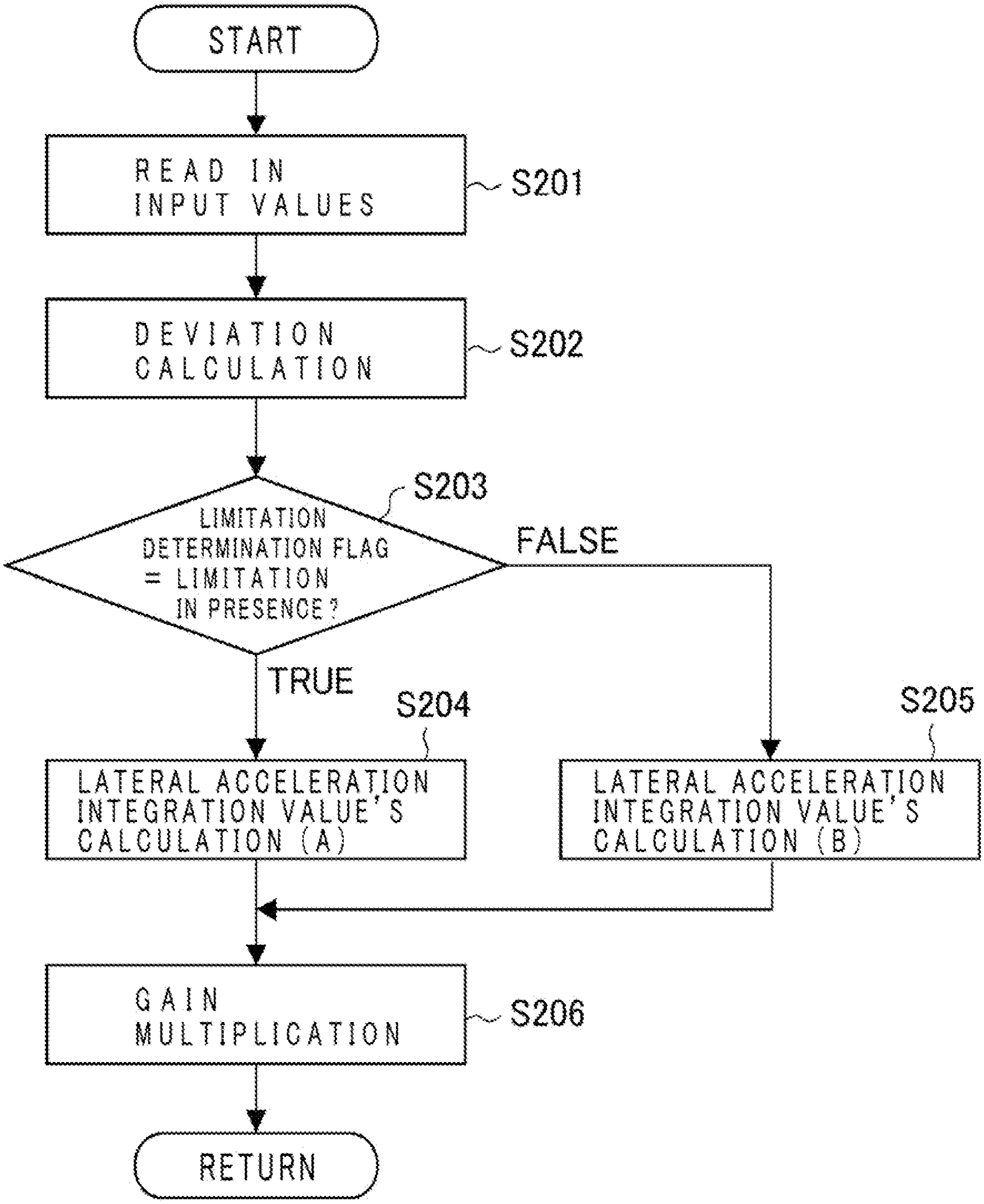
FIG. 5 is a flowchart for explaining the operations by a steering control-quantity limit-value calculation unit in the motor vehicle steering system according to Embodiment 2.

In FIG. 5, shown is a flowchart for explaining the operations of the steering control-quantity limit-value calculation unit 12*a*.

First, at Step S201, the steering control-quantity limit-value calculation unit 12*a* reads in a lateral acceleration into which the lateral acceleration detection unit 2 outputs, a steering control quantity into which the steering control-quantity calculation unit outputs and a limitation determination flag into which the limitation determination unit 11 outputs.

Next, at Step S202, the calculation in the deviation calculator 120 is carried out, so that the deviation between a lateral acceleration limit-value and the absolute value of lateral acceleration is calculated as a lateral acceleration deviation as given in Expression (1) described below.

$$dGy = Gy\_\text{limit} - |Gy| \quad (1)$$

Where, dGy: a lateral acceleration deviation,

Gy_limit: a lateral acceleration limit-value, and

Gy: a lateral acceleration.

Subsequently, from Step S203 to Step S206, the calculation in the integrator 121 is carried out.

First, at Step S203, conditional branch determination is performed on the basis of a limitation determination flag; and, in a case in which the limitation determination flag is set at "limitation in presence," namely, in a case in which a lateral acceleration of a host vehicle is at a lateral acceleration limit-value or more, the processing proceeds to Step S204, and, in a case other than the aforementioned case, the processing proceeds to Step S205.

At Step S204, a lateral acceleration integration value is calculated by means of the lateral acceleration integration value's calculation (A) in accordance with Expression (2) described below.

$$I\_Gy = I\_Gy \text{ in Previous Value} + dGy \times dT \quad (2)$$

Where,

I_Gy: a lateral acceleration integration value, dT: an integral calculation period, Gy_limit: a lateral acceleration limit-value, and Gy: a lateral acceleration.

At Step S205, a lateral acceleration integration value is calculated by means of the lateral acceleration integration value's calculation (B) in accordance with Expression (3) described below. Namely, a lateral acceleration integration value is set to a value so that a steering control-quantity limit-value becomes corresponding to a steering control quantity, whereby, when a limitation determination flag is set at "limitation in absence," the steering control quantity would not be limited in the steering control-quantity limiting unit 13, and also, when the limitation determination flag becomes from "limitation in absence" to "limitation in presence" so that the limitation of steering control quantity is started, it becomes possible to prevent that the steering control-quantity limit-value becomes discontinuous with respect to a steering control quantity, and that the steering control quantity becomes discontinuous.

$$I\_Gy = Q\_ctr/KI \quad (3)$$

Where,

I_Gy: a lateral acceleration integration value,

Q_ctr: a steering control quantity, and

KI: a gain.

Next, at Step S206, the calculation in the gain multiplier 122 is carried out in accordance with Expression (4) described below; and so, a lateral acceleration integration value is multiplied by an arbitrary gain being set in advance, so that a steering control-quantity limit-value is calculated as it is.

$$Q\_\text{limit} = KI \times I\_Gy \quad (4)$$

Where,

Q_limit: a steering control-quantity limit-value.

According to the manner described above, when a lateral acceleration of a host vehicle is larger than a lateral acceleration limit-value, a steering control-quantity limit-value is adjusted on the basis of the deviation between the lateral acceleration limit-value and the lateral acceleration; and thus, in comparison with a case in which a steering control-quantity limit-value is held in Embodiment 1, a lateral acceleration of a motor vehicle can be limited with a higher degree of accuracy even with respect to changes in running environments such as the variability of motor vehicles and/or a cant or the like of a running road-route. And therefore, without depending on running environments such as the variability of motor vehicles and/or a cant or the like of the running road-route, it becomes possible to enhance the effects to mitigate burdens of an operator or driver originating in the feelings of anxiety of the driver and in unpleasant feelings thereof.

Here, in Embodiment 2, the configuration is adopted in such a manner that the steering control-quantity limit-value calculation unit 12*a* calculates a steering control-quantity limit-value only on the basis of an integral element of a lateral acceleration deviation being the deviation between a lateral acceleration limit-value and the absolute value of lateral acceleration; however, a configuration may be adopted in such a manner that a proportional element of a lateral acceleration deviation or a differential element thereof is added to. For example, when a proportional element is added to, it becomes possible to enhance follow-up capabilities with respect to the lateral acceleration limit-value. When a proportional element is added to, it is suitable to adopt that a resetting process of a lateral acceleration integration value of Expression (3) at Step S205 is replaced by the following Expression (5), and that a gain multiplication process of Expression (4) at Step S206, replaced by the following Expression (6), respectively.

$$I\_Gy = Q\_\text{ctr}/KI - KP \times dGy \quad (5)$$

Where,

KP: a proportional element's gain.

$$Q\_\text{limit} = KI \times I\_Gy + KP \times dGy \quad (6)$$

Note that, in Embodiment 1 and in Embodiment 2, it is so arranged that a camera(s) is used as the running road-route recognition unit 3, and that a running road-route toward the front is recognized by means of the camera (s); however, it may also be so arranged that a running road-route is recognized by using a means other than a camera(s). And so, it is possible to obtain those effects similar to the effects of the motor vehicle steering apparatus stated in Embodiment 2. For example, it may be configured in such a manner that a running road-route of a motor vehicle toward the front thereof is recognized on the basis of a host-vehicle location of the motor vehicle and on that of geographic road-map information which are received from a satellite (s) capable of communicating, and/or it may also be configured in such a manner that a running road-route toward the front is recognized on the basis of a locus of a motor vehicle which runs in the front where the locus is acquired by using a radar, a camera(s) or the like; and so, the means will not be questioned for.

Modification Examples of the Embodiments

In a manner, a steering control quantity is defined as target torque (driving torque) for driving the steering-wheel turn actuator 4, for example; however, it may be so arranged that the steering control quantity is defined as a target steering angle for steering a motor vehicle so that the motor vehicle runs to follow up along a target running road-route line.

Figure 6:
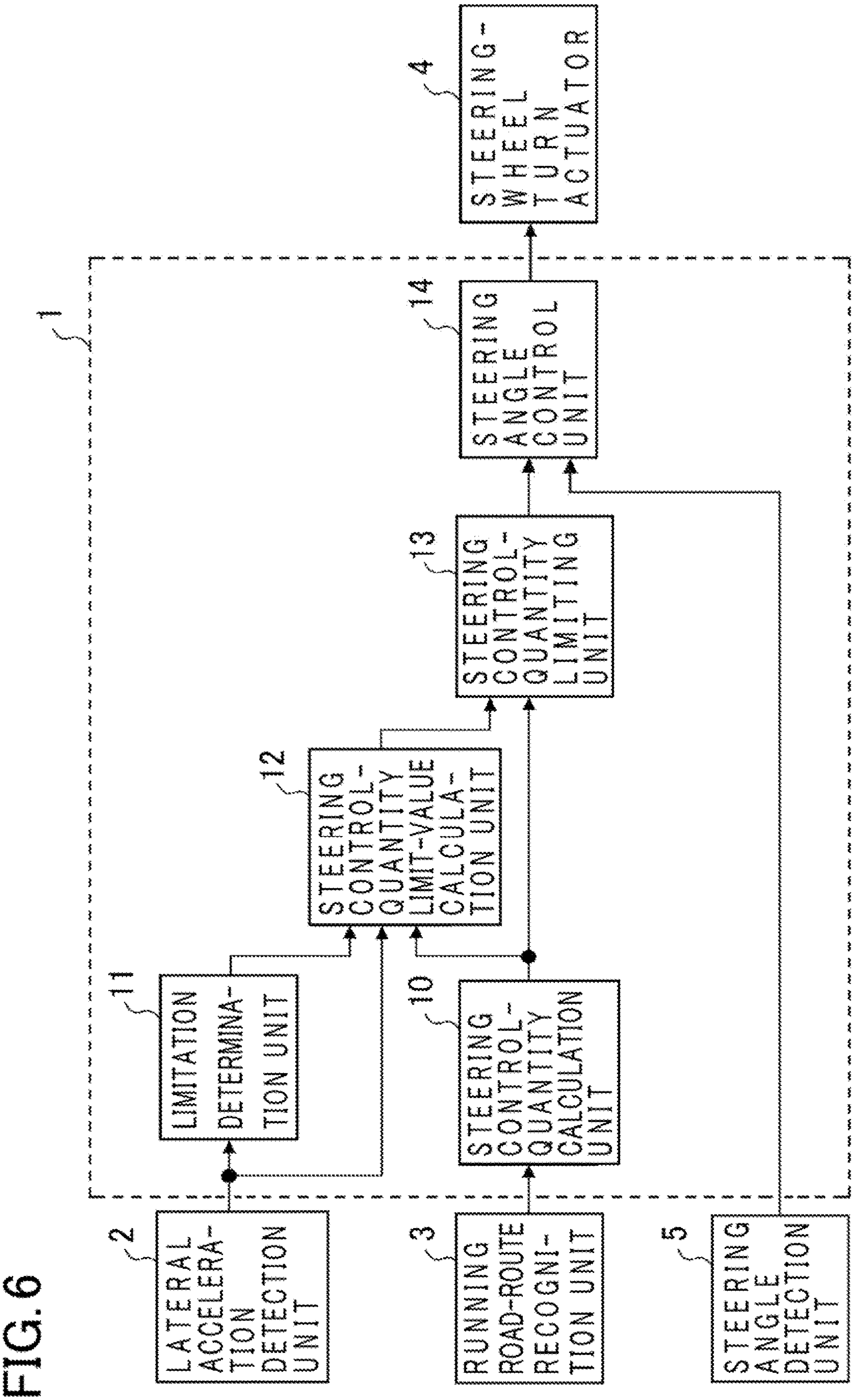
FIG. 6 is a functional block diagram illustrating a motor vehicle steering system being a modification example of Embodiment 1.

A functional block diagram illustrating the configuration of a motor vehicle steering system according to Embodiment 1 in such a case takes on a configuration as that shown in FIG. 6, for example; and so, a steering control quantity and a steering control-quantity limit-value in the steering control-quantity limit-value calculation unit 12 and the steering control-quantity limiting unit 13 also become a target steering angle and a target steering angle limit-value, respectively. In addition, the configuration in this case takes on to include a steering angle detection unit 5 and a steering angle control unit 14. Accordingly, a steering angle of a host vehicle is detected by the steering angle detection unit 5, and is outputted into the steering angle control unit 14 therefrom; and, on the basis of a steering control quantity, namely, a target steering angle inputted by the steering control-quantity limiting unit 13, and on that of a steering angle inputted by the steering angle detection unit 5, target torque (driving torque) is calculated by the steering angle control unit 14 so that a steering angle of the host vehicle follows up the target steering angle, and is outputted into the steering-wheel turn actuator 4.

Here, it is suitable that the calculation of target torque (driving torque) in the steering angle control unit 14 is carried out by means of a publicly known control method on the basis of a proportional element of the deviation between a target steering angle and a steering angle, on that of an integral element, or on that of the like; and so, the calculation means will not be questioned for. By taking the configuration described above, a steering angle being a steering control quantity at a time point when a lateral acceleration of a host vehicle reaches at a lateral acceleration limit-value is held by the steering control-quantity limit-value calculation unit 12, whereby, similarly to Embodiment 1, it becomes possible to prevent that a lateral acceleration of the host vehicle increases even more to an extent exceeding, namely, it is possible to limit the lateral acceleration of the host vehicle to the lateral acceleration limit-value.

Figure 7:
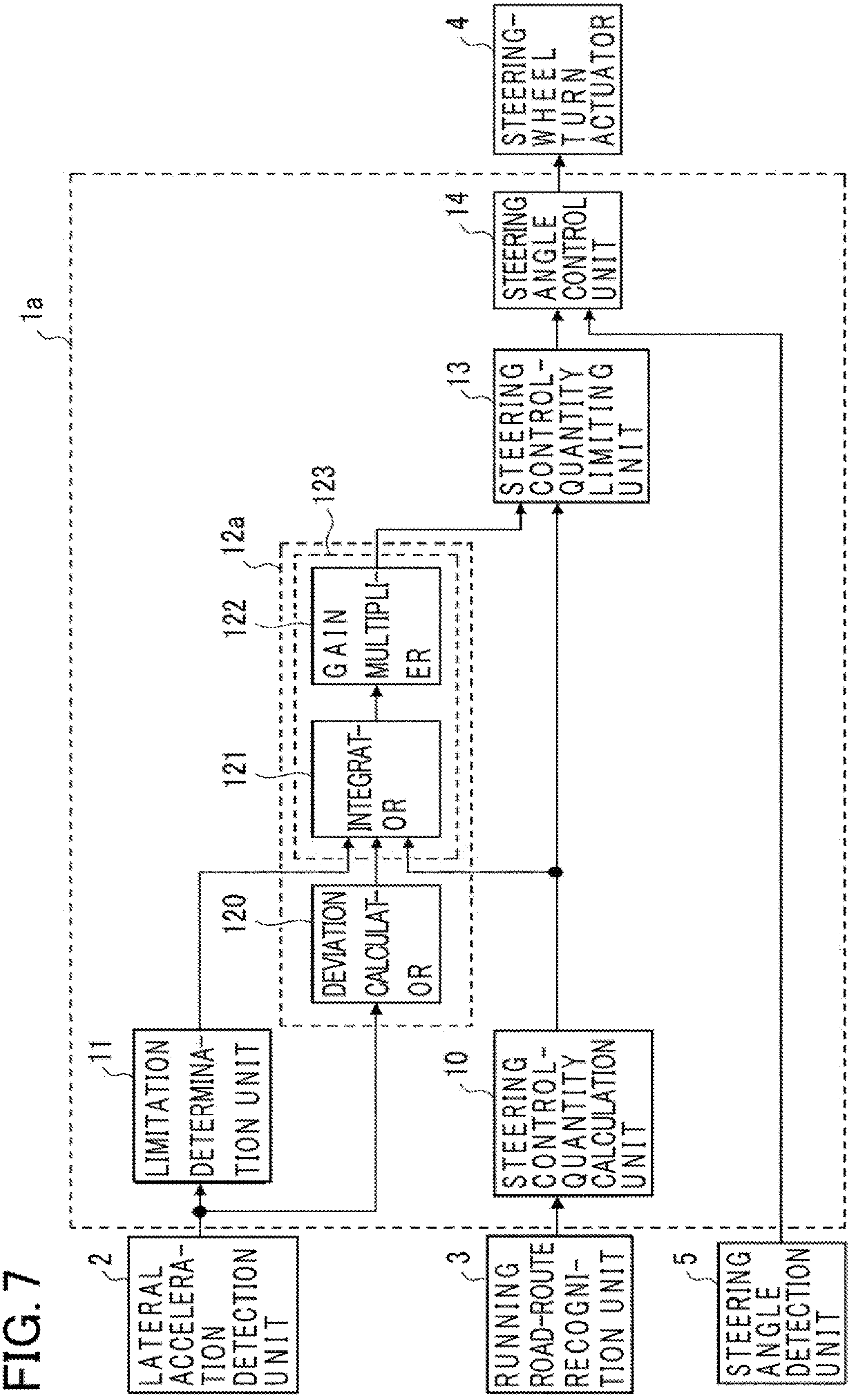
FIG. 7 is a functional block diagram illustrating a motor vehicle steering system being a modification example of Embodiment 2.

In another manner, a functional block diagram illustrating the configuration of a motor vehicle steering system according to Embodiment 2 in such a case takes on a configuration as that shown in FIG. 7, for example; and so, the configuration takes on to include the steering angle detection unit 5 and the steering angle control unit 14 in a similar manner to FIG. 6.

By taking the configuration described above, a steering angle being a steering control quantity is adjusted by the steering control-quantity limit-value calculation unit 12*a*, when a lateral acceleration of a host vehicle is larger than a lateral acceleration limit-value, on the basis of the deviation between the lateral acceleration limit-value and the lateral acceleration, whereby, similarly to Embodiment 2, it becomes possible to prevent that a lateral acceleration of the host vehicle increases even more to an extent exceeding, namely, it is possible to limit the lateral acceleration of the host vehicle to the lateral acceleration limit-value with a higher degree of accuracy.

In the present disclosure of the application concerned, various exemplary embodiments and implementation examples are described; however, various features, aspects and functions described in one or a plurality of embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the disclosure of the application concerned. For example, there arise cases which are included as a case in which at least one constituent element is modified, added or eliminated, and further a case in which at least one constituent element is extracted and then combined with a constituent element(s) of another embodiment.

EXPLANATION OF NUMERALS AND SYMBOLS

Numeral "1" designates a steering apparatus; "2," lateral acceleration detection unit; "3," running road-route recognition unit; "4," steering-wheel turn actuator; "5," steering angle detection unit; "10," steering control-quantity calculation unit; "11," limitation determination unit; "12," steering control-quantity limit-value calculation unit; "13," steering control-quantity limiting unit; and "14," steering angle control unit.

The invention claimed is:

1. A motor vehicle steering system which assists steering operations so that a motor vehicle runs to follow up along a target running road-route line, the motor vehicle steering system, comprising:

a lateral acceleration detector for detecting a lateral acceleration of the motor vehicle;

a memory stores a program for processing; and a processor for processing functions to assist steering operations with the program, wherein the processor is configured to:

calculate a steering control quantity to move the motor vehicle closer to the target running road-route line;

calculate a steering control-quantity limit-value on a basis of a lateral acceleration detected by the lateral acceleration detector in such a manner that a lateral acceleration of the motor vehicle is limited to a lateral acceleration limit-value;

determine effectiveness of steering control-quantity's limitation or ineffectiveness thereof at least on a basis of said lateral acceleration;

limit a steering control quantity on a basis of said steering control-quantity limit-value, when steering control-quantity's limitation is effective;

calculate the steering control-quantity limit-value with a deviation calculation for calculating a deviation between said lateral acceleration limit-value and said lateral acceleration and a deviation amplifying for amplifying an output of the deviation calculation; and calculate said steering control-quantity limit-value on a basis of an output of the deviation amplifying.

2. The motor vehicle steering system as set forth in claim 1, wherein the processor is further configured to determine effectiveness of steering control-quantity's limitation or ineffectiveness thereof at least on a basis of said lateral acceleration and on that of said steering control-quantity limit-value.

3. The motor vehicle steering system as set forth in claim 1, wherein the processor is further configured to calculate a steering control-quantity limit-value as a steering control quantity at a time point when said lateral acceleration reaches at said lateral acceleration limit-value.

4. The motor vehicle steering system as set forth in claim 1, wherein the processor is further configured to amplify the deviation amplifying with an integration for integrating at least an output of the deviation calculator.

5. The motor vehicle steering system as set forth in claim 2, wherein the processor is further configured to amplify the deviation amplifying with an integration for integrating at least an output of the deviation calculator.

6. The motor vehicle steering system as set forth in claim 3, wherein the processor is further configured to amplify the deviation amplifying with an integration for integrating at least an output of the deviation calculator.

7. The motor vehicle steering system as set forth in claim 4, wherein the processor is further configured to set an integral element of the integration to a value in which a steering control-quantity limit-value is coincident with a steering control quantity each other, when the determines that steering control-quantity's limitation is ineffective.

8. The motor vehicle steering system as set forth in claim 5, wherein the processor is further configured to set an integral element of the integration to a value in which a steering control-quantity limit-value is coincident with a steering control quantity each other, when the determines that steering control-quantity's limitation is ineffective.

9. The motor vehicle steering system as set forth in claim 6, wherein the processor is further configured to set an integral element of the integration to a value in which a steering control-quantity limit-value is coincident with a steering control quantity each other, when the determines that steering control-quantity's limitation is ineffective.

10. The motor vehicle steering system as set forth in claim 1, further comprising:

a steering-wheel turn actuator for activating a steering-wheel turn tire-wheel of the motor vehicle to undergo turn directions, wherein said steering control quantity is driving torque of the steering-wheel turn actuator, and a steering control-quantity limit-value where the steering control-quantity limit-value calculation device calculates is a driving torque limit-value, and wherein the processor is configured to limit the driving torque of the steering-wheel turn actuator to the driving torque limit-value.

11. The motor vehicle steering system as set forth in claim 2, further comprising:

a steering-wheel turn actuator for activating a steering-wheel turn tire-wheel of the motor vehicle to undergo turn directions, wherein said steering control quantity is driving torque of the steering-wheel turn actuator, and a steering control-quantity limit-value where the steering control-quantity limit-value calculation device calculates is a driving torque limit-value, and wherein the processor is configured to limit the driving torque of the steering-wheel turn actuator to the driving torque limit-value.

12. The motor vehicle steering system as set forth in claim 3, further comprising:

a steering-wheel turn actuator for activating a steering-wheel turn tire-wheel of the motor vehicle to undergo turn directions, wherein said steering control quantity is driving torque of the steering-wheel turn actuator, and a steering control-quantity limit-value where the steering control-quantity limit-value calculation device calculates is a driving torque limit-value, and wherein the processor is configured to limit the driving torque of the steering-wheel turn actuator to the driving torque limit-value.

13. The motor vehicle steering system as set forth in claim 1, further comprising:

a steering angle detector for detecting a steering angle of a steering-wheel turn tire-wheel of the motor vehicle; and a steering-wheel turn actuator for activating a steering-wheel turn tire-wheel of the motor vehicle to undergo turn directions;

wherein the processor is configured to control a steering angle in which said steering control quantity is a target steering angle of the motor vehicle, and by which the steering-wheel turn actuator is driven so that the steering angle follows up the target steering angle, wherein a steering control-quantity limit-value is a target steering angle limit-value, and wherein the processor is configured to limit the target steering angle to the target steering angle limit-value.

14. The motor vehicle steering system as set forth in claim 2, further comprising:

a steering angle detector for detecting a steering angle of a steering-wheel turn tire-wheel of the motor vehicle; and a steering-wheel turn actuator for activating a steering-wheel turn tire-wheel of the motor vehicle to undergo turn directions;

wherein the processor is configured to control a steering angle in which said steering control quantity is a target steering angle of the motor vehicle, and by which the steering-wheel turn actuator is driven so that the steering angle follows up the target steering angle, wherein a steering control-quantity limit-value is a target steering angle limit-value, and wherein the processor is configured to limit the target steering angle to the target steering angle limit-value.

15. The motor vehicle steering system as set forth in claim 3, further comprising:

a steering angle detector for detecting a steering angle of a steering-wheel turn tire-wheel of the motor vehicle; and a steering-wheel turn actuator for activating a steering-wheel turn tire-wheel of the motor vehicle to undergo turn directions;

wherein the processor is configured to control a steering angle in which said steering control quantity is a target steering angle of the motor vehicle, and by which the steering-wheel turn actuator is driven so that the steering angle follows up the target steering angle, wherein a steering control-quantity limit-value is a target steering angle limit-value, and wherein the processor is configured to limit the target steering angle to the target steering angle limit-value.

* * * * *